Patented Mar. 1, 1949

2,463,227

UNITED STATES PATENT OFFICE 2,463,227

PROCESS OF REACTING FORMALDEHYDE, HYDROGEN CHLORIDE, AND ACETYLENE, AND PRODUCTS PRODUCED THEREBY

Joseph Frederic Walker, Lewiston, N. Y., assignor to E. I. du Pont de Nemours & Company, Wilmington, Del., a corporation of Delaware No Drawing. Application November 17, 1944, Serial No. 563,990

8 Claims. (Cl. 260—338)

This invention relates to the production of new chemical products, and more particularly it relates to the production of new chlorine-containing formals.

It is an object of this invention to synthesize certain new chlorine-containing formals by the reaction of formaldehyde, hydrogen chloride and acetylene.

It is another object of this invention to produce a mixture of chlorine-containing formals comprising 5-dichloromethyl-1,3-dioxane and formals having the empirical formula $C_9H_{15}O_3Cl_5$ by the reaction of formaldehyde, hydrogen chloride and acetylene.

It is another object of this invention to produce 5-dichloromethyl-1,3-dioxane.

It is still another object of this invention to produce a mixture of formals having the empirical formula $C_9H_{15}O_3Cl_5$.

It is another object of this invention to provide a process for the production of the above-mentioned formals.

Other objects of the invention will appear hereinafter.

The objects of this invention may be accomplished, in general, by passing acetylene into a mixture of hydrogen chloride and formaldehyde, or a polymer of formaldehyde which under acidic conditions will react as formaldehyde, in the presence of an acidic catalyst.

In accordance with one method of carrying out the present invention, formaldehyde or a formaldehyde polymer of the polyoxymethylene type is added to a solution of an acidic catalyst in aqueous hydrochloric acid having a temperature of between 45° C. and 75° C. and passing acetylene into the mixture to produce a water-insoluble liquid containing between 40% and 50% combined chlorine.

The process of this invention may also be carried out to excellent advantage by dissolving an acidic catalyst in an aqueous solution of formaldehyde, or by dissolving an acidic catalyst and formaldehyde in water or other reaction medium, and passing acetylene and hydrogen chloride into said solution whereby to form the reaction product of formaldehyde, hydrogen chloride and acetylene. In this case, the acetylene and hydrogen chloride may advantageously be in gaseous form.

The formaldehyde may be in the form of an aqueous solution, for example a commercial 37% solution of formaldehyde or it may be in the form of a formaldehyde polymer which will react as formaldehyde under acidic conditions; i. e., a polymer of the polyoxymethylene type, for example, paraformaldehyde, alpha-polyoxymethylene, trioxane or the like. Throughout the specification and claims, the term "formaldehyde" is meant to include polymers of formaldehyde which will react as formaldehyde under acidic conditions. Since the reaction takes place to best advantage in an aqueous medium, it is preferred that the hydrochloric acid be present as an aqueous solution of hydrochloric acid, for example, a 37% aqueous solution of hydrochloric acid.

The reaction of this invention will take place to a slight extent in the absence of a catalyst; however, in order to produce a satisfactory yield within a reasonable period of time a catalyst is necessary. Acidic catalysts have been found to work to good advantage. The following acidic materials have been found to catalyze the reaction of the present invention; zinc chloride, ferric chloride, cadmium chloride, aluminum chloride, stannic chloride and sulfuric acid. The preferred catalysts are zinc chloride, ferric chloride and cadmium chloride, the first of these three being outstanding. The following table gives the absorption rates of acetylene when the several above mentioned metal chlorides are used in carrying out the reaction. The rate of acetylene absorption is substantially proportional to the rate of reaction. The reaction with the metal chloride catalysts set forth in the table, in each case, was carried out at atmospheric pressure, at a temperature of approximately 60° C., and with the catalyst present in the amount of 350 g. in 500 g. of 10 N aqueous hydrochloric acid solution containing 30 g. formaldehyde.

| | Metal Chloride | Acetylene Absorbed at 60° C. |
|---|---|---|
| 1 | Zinc Chloride | 2500 ml. per hr. per 500 ml. solution. |
| 2 | Ferric Chloride | 540 ml. per hr. per 500 ml. solution. |
| 3 | Cadmium Chloride | 490 ml. per hr. per 500 ml. solution. |
| 4 | Stannic Chloride | 170 ml. per hr. per 500 ml. solution. |
| 5 | Aluminum Chloride | Only slightly soluble in concentrated hydrochloric acid solution, very slow absorption of acetylene. |

After completion of the reaction between hydrochloric acid, formaldehyde, and acetylene, in accordance with the present invention, about ⅓ to ⅔ of the product will be found to be separated as a supernatant liquid, the remainder being dissolved in the aqueous reaction medium. The supernatant liquid is separated from the reaction medium, and the remainder of the reaction product is removed from the reaction medium by extraction with methylene chloride or other suitable solvent. The products are recovered respectively from the supernatant liquid and the extract by fractional distillation at reduced pressure. Fractional distillation separates the product in two fractions; one boiling at a temperature of 86° C.–88° C. at 4 mm. Hg pressure, and the other boiling at 205° C.–220° C. at 5 mm. Hg pressure. The fraction boiling at 86° C.–88° C. has been identified as the substantially pure cyclic formal 5-dichloromethyl-1,3-dioxane, and the high boiling fraction has been identified as a mixture of chlorinated linear formals having a density of 1.44 and an empirical formula $C_9H_{15}O_3Cl_5$.

The following example illustrates in specific detail a preferred method of practicing the present invention, it being understood, of course, that the invention is not limited to the details set forth in the example.

Example 900 grams of zinc chloride were dissolved in approximately an equal weight of 37% hydrochloric acid; approximately 60 grams paraformaldehyde were added to the solution and acetylene passed in. The rate of acetylene absorption was ¾ liter per hour. The reaction was carried out at atmospheric pressure and 60° C. In the reaction, approximatey 2 moles of formaldehyde and 2 moles hydrochloric acid were used for each mole of acetylene reacted. The product was partially soluble in the reaction mixture, about 40% separating as a supernatant layer. The product which separated was removed by means of a separatory funnel, and then the part of product dissolved in the reaction mixture was extracted with methylene chloride. The total recovered product was about 60% of the weight of total reactants used. The product fractions contained zinc chloride and other impurities which cause decomposition if attempt is made to distill without purification. Therefore, each product was treated by first shaking with an aqueous solution of sodium carbonate until neutral, then shaking with sodium acid sulfite solution to remove formaldehyde. The products were then combined and fractionally distilled. This fractionation resulted in two main product fractions, one boiling at 86° C.–88° C. at 4 mm. and the other at 205° C.–220° C. at 5 mm. These two fractions accounted for 70–80% of the purified reaction product, most of the remainder being very high boiling viscous material. The ratio of higher boiling to lower boiling fraction based on total yield was about 6:1 in the supernatant layer and 1:1.4 in the product extracted from the aqueous layer.

The lower boiling fraction is a colorless mobile liquid of camphor-like odor, which distills at 86° C.–88° C. at 4 mm., has a density of 1.35 at 20° C. and an index of refraction of 1.4877 at 20° C. Results of molecular weight determinations and elemental analyses are shown below.

|  | Mol. Wt. | Percent C | Percent H | Percent Cl |
|---|---|---|---|---|
| Theory ($C_5H_8O_2Cl_2$) | 171 | 35.1 | 4.7 | 41.5 |
| Found | approx. 175 | 36.7 | 5.5 | 40.5 |

The slightly lower amount of chlorine found, and the slightly higher amount of carbon found were expected due to slight decomposition on distillation with loss of HCl.

Attempts to acetylate or add bromine to the compound gave negative results, indicating that hydroxyl groups and unsaturated linkages were absent. No formaldehyde was liberated on treating with dilute alkali, from which it follows that chloromethyl ether groups also are not present.

When the compound was tested for formal groups by dissolving in concentrated sulfuric acid, heating and diluting with water, the odor of formaldehyde could be noted after dilution, showing that formal groups were present. Acid hydrolysis with dilute hydrochloric acid in the presence of phloroglucinol gave phloroglucinol-formaldehyde resin equivalent to 0.96 mols of formaldehyde per mol of product. This demonstrates the presence of one formal ($-O-CH_2-O-$) grouping. (This method of determining formaldehyde in formals was developed by Clowes (Ber., 32, 2841 (1899)).

On refluxing with methanolic potassium hydroxide solution, approximately half the chlorine was removed giving a compound boiling at 70° C.–75° C. at 6 mm. with a chlorine content of 28.0%. This compound absorbed bromine slowly and probably possesses the structure:

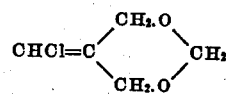

These findings indicate that the product comprising the lower boiling fraction is principally 5-dichloromethyl-1,3-dioxane.

The higher boiling fraction is a substantially odorless and somewhat viscous liquid, boiling at 205° C.–220° C. at 5 mm. It has a density of approximately 1.44 at 20° C. The following tabulation gives a comparison between the theoretical molecular weight and percentage content of carbon, hydrogen and chlorine of $C_9H_{15}O_3Cl_5$ and the corresponding values of the higher boiling fraction as determined by analysis:

|  | Theoretical | Found by Analysis |
|---|---|---|
| C | 31.0 | 33.0 |
| H | 4.3 | 4.4 |
| Cl | 51 | 49.5 |
| Mol. wt | 349 | approx. 350 |

Here again the slightly low chlorine and slightly high carbon, found by analysis is due to unavoidable decomposition on distillation.

This fraction behaved like the lower boiling fraction, when attempts were made to acetylate it or to add bromine, and did not liberate formaldehyde on treatment with dilute alkali, indicating that no chloromethyl ether groups were present.

As with the lower boiling compound, treatment with sulfuric acid indicated the presence of formal groups. By heating with 10% hydrochloric acid, with agitation for 36 hours in the presence of phloroglucinol, then removing and weighing the insoluble phloroglucinol-formaldehyde product, it was found that approximately one mol of formaldehyde was removed per mol product, indicating that only one formal linkage was present.

Refluxing this high boiling fraction with methanolic potassium hydroxide removed ⅔ of the chlorine, indicating that two mols of hydrogen chloride were lost. The product of this reaction had B. P. 170° C.–185° C. at 6 mm. and contained 36.1% Cl (theory for $C_9H_{13}O_3Cl_3$, 38.7% Cl). Bromine absorption by the product was very slow.

The higher boiling fraction appears to be a mixture of isomeric formals whose structural formulas are,

or

The residue left after distillation of the high boiling fraction is a resinous material probably containing polymeric formals produced by reactions involving several mols of the 4-carbon chlorinated glycols and formaldehyde.

Although it is preferred to carry out the reaction of the present invention in the presence of aqueous reaction media, the reaction can also be carried out in other reaction media. The reaction has, for example, been carried out in acetic acid as reaction medium. When the reaction is carried out in acetic acid with zinc chloride as a catalyst, the principal product formed is 5-dichloromethyl-1,3-dioxane. However, under these conditions there is also obtained an acetic ester whose chlorine content indicates that it is probably the diacetate of the glycol whose formal is 5-dichloro-methyl-1,3-dioxane, i. e., the diacetate of dihydroxy dichlorobutane,

or the isomeric ester,

This ester distills at 120° C. to 125° C. at 8 mm. Hg pressure. Other aliphatic acids containing from 1 to 4 carbon atoms may be similarly used as reaction media, in which case the product consists of the corresponding esters of a dihydroxy dichlorobutane whose empirical formula is $C_4H_8O_2Cl_2$.

The products of the present invention may be employed as solvents and insecticides. Both the lower boiling and higher boiling products of the present invention, whether present alone or in admixture with each other may be used as solvents or insecticides. The 5-dichloromethyl-1,3-dioxane may also be used as a chemical intermediate for the production of other chemical compounds. The linear formal or formals having the empirical formula $C_9H_{15}O_3Cl_5$ may also be used as a plasticizer for chemical compounds and compositions.

Throughout the specification and claims, percentages and proportions referred to are to be taken as percentages and proportions by weight, unless otherwise specified.

Since it is obvious that many changes and modifications can be made in the above described details without departing from the nature and spirit of the invention, it is to be understood that the invention is not to be limited to said details, except as set forth in the appended claims.

I claim:

1. The process of forming chlorine-containing formals which comprises admixing formaldehyde, hydrogen chloride and acetylene in an aqueous reaction medium at a temperature of 45° C. to 75° C. whereby to form a reaction between said formaldehyde, hydrogen chloride and acetylene in the proportion of approximately two moles formaldehyde and two moles hydrogen chloride for each mole acetylene.

2. The process of forming chlorine-containing formals which comprises admixing formaldehyde, hydrogen chloride and acetylene in an aqueous reaction medium at a temperature of 45° C. to 75° C. in the presence of an acidic catalyst taken from the group consisting of zinc chloride, ferric chloride, and cadmium chloride whereby to form a reaction between said formaldehyde, hydrogen chloride and acetylene in the proportion of approximately two moles formaldehyde and two moles hydrogen chloride for each mole acetylene.

3. The process which comprises dissolving formaldehyde and hydrogen chloride in an aqueous reaction medium at a temperature of 45° C. to 75° C., and passing acetylene into said solution whereby to form a reaction between said formaldehyde, hydrogen chloride and acetylene in the proportion of approximately two moles formaldehyde and two moles hydrogen chloride for each mole acetylene.

4. The process which comprises dissolving formaldehyde and an acidic catalyst taken from the group consisting of zinc chloride, ferric chloride, and cadmium chloride in an aqueous solution of hydrogen chloride, and passing acetylene into said solution at a temperature between 45° C. and 75° C. whereby to react formaldehyde, hydrogen chloride and acetylene in the proportion of approximately two moles formaldehyde and two moles hydrogen chloride for each mole acetylene.

5. As a new composition, a mixture of 5-dichloromethyl-1,3-dioxane and a chlorinated linear formal having the empirical formula $C_9H_{15}O_3Cl_5$ said formal having a boiling point of between 205° C. and 220° C. at 5 mm. Hg, a density of approximately 1.44 at 20° C., and containing only one formal linkage.

6. As a new compound, 5-dichloromethyl-1,3-dioxane.

7. As a new compound a linear formal having the empirical formula $C_9H_{15}O_3Cl_5$ said formal having a boiling point of between 205° C. and 220° C. at 5 mm. Hg, a density of approximately 1.44 at 20° C., and containing only one formal linkage.

8. The process which comprises dissolving formaldehyde and an acidic catalyst taken from the group consisting of zinc chloride, ferric chloride, and cadmium chloride in an aqueous reaction medium at a temperature of 45° C. to 75° C., and passing acetylene and hydrogen chloride into said solution whereby to obtain a reaction product of formaldehyde, hydrogen chloride and acetylene in the proportion of approximately two moles formaldehyde and two moles hydrogen chloride for each mole acetylene.

JOSEPH FREDERIC WALKER.

REFERENCES CITED

The following references are of record in the file of this patent:

UNITED STATES PATENTS

| Number | Name | Date |
|---|---|---|
| 2,182,754 | Billig | Dec. 5, 1939 |
| 2,247,256 | Senkus | June 24, 1941 |
| 2,260,753 | Marple et al. | Oct. 28, 1941 |
| 2,290,462 | Allen et al. | July 21, 1942 |
| 2,296,375 | Arundale et al. | Sept. 22, 1942 |
| 2,383,091 | Toussaint et al. | Aug. 21, 1945 |

FOREIGN PATENTS

| Number | Country | Date |
|---|---|---|
| 507,571 | Great Britain | June 14, 1939 |

OTHER REFERENCES

Beilstein: Handbuch der Organischen Chemie, Vierte Auflage, Band II, 1930, syst. 159, page 143.